(12) United States Patent
Hu et al.

(10) Patent No.: US 11,908,461 B2
(45) Date of Patent: Feb. 20, 2024

(54) DELIBERATION MODEL-BASED TWO-PASS END-TO-END SPEECH RECOGNITION

(71) Applicant: Google LLC, Mountain View, CA (US)

(72) Inventors: Ke Hu, Stony Brook, NY (US); Tara N. Sainath, Jersey City, NJ (US); Ruoming Pang, New York, NY (US); Rohit Prakash Prabhavalkar, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 161 days.

(21) Appl. No.: 17/149,018

(22) Filed: Jan. 14, 2021

(65) Prior Publication Data

US 2021/0225369 A1 Jul. 22, 2021

Related U.S. Application Data

(60) Provisional application No. 62/963,721, filed on Jan. 21, 2020.

(51) Int. Cl.
| | |
|---|---|
| *G10L 15/18* | (2013.01) |
| *G06N 3/049* | (2023.01) |
| *G10L 15/06* | (2013.01) |
| *G10L 15/16* | (2006.01) |
| *G10L 15/187* | (2013.01) |
| *G10L 19/00* | (2013.01) |

(52) U.S. Cl.
CPC .......... *G10L 15/1815* (2013.01); *G06N 3/049* (2013.01); *G10L 15/063* (2013.01); *G10L 15/16* (2013.01); *G10L 15/187* (2013.01); *G10L 19/0018* (2013.01)

(58) Field of Classification Search
CPC ... G10L 15/1815; G10L 15/063; G10L 15/16; G10L 15/187; G10L 19/0018; G06N 3/049
See application file for complete search history.

(56) References Cited

U.S. PATENT DOCUMENTS 10,176,802 B1 * 1/2019 Ladhak ................. G10L 19/038
11,158,307 B1 * 10/2021 Ghias ................... G06N 3/0445
(Continued)

OTHER PUBLICATIONS

International Search Report for the related Application No. PCT/US2021/013449, dated May 6, 2021, 51 pages.
(Continued)

*Primary Examiner* — Bhavesh M Mehta
*Assistant Examiner* — Edward Tracy, Jr.
(74) *Attorney, Agent, or Firm* — Honigman LLP; Brett A. Krueger; Grant J. Griffith

(57) ABSTRACT

A method of performing speech recognition using a two-pass deliberation architecture includes receiving a first-pass hypothesis and an encoded acoustic frame and encoding the first-pass hypothesis at a hypothesis encoder. The first-pass hypothesis is generated by a recurrent neural network (RNN) decoder model for the encoded acoustic frame. The method also includes generating, using a first attention mechanism attending to the encoded acoustic frame, a first context vector, and generating, using a second attention mechanism attending to the encoded first-pass hypothesis, a second context vector. The method also includes decoding the first context vector and the second context vector at a context vector decoder to form a second-pass hypothesis.

26 Claims, 6 Drawing Sheets

(56) References Cited

U.S. PATENT DOCUMENTS

| | | | | |
|---|---|---|---|---|
| 2017/0221474 A1* | 8/2017 | Hori | .................... | G10L 15/063 |
| 2020/0312306 A1* | 10/2020 | Moritz | .................... | G10L 15/22 |
| 2020/0357392 A1* | 11/2020 | Zhou | .................... | G10L 15/1822 |
| 2021/0183373 A1* | 6/2021 | Moritz | .................... | G10L 15/22 |

OTHER PUBLICATIONS

Xia Yingce et al: "Deliberation Networks: Sequence Generation Beyond One-Pass Decoding", Jan. 1, 2017 (Jan. 1, 2017), XP055779737, Retrieved from the Internet: URL:https://dl.acm.org/doi/pdf/10.5555/3294 771 .3294941.

Tara N Sainath et al: "Two-Pass End-to-End Speech Recognition", arxiv.org, Cornell University Library, 201 Olin Library Cornell University Ithaca, NY 14853, Aug. 29, 2019 (Aug. 29, 2019), XP081489070.

Golan Pundak et al: "Deep context: end-to-end contextual speech recognition", arxiv.org, Cornell University Library, 201 Olin Library Cornell University Ithaca, NY 14853, Aug. 7, 2018 (Aug. 7, 2018), XP081 254719.

Sung Tzu-Wei et al: "Towards End-to-end Speech-to-text Translation with Two-pass Decoding", ICASSP 2019—2019 IEEE International Conference on Acoustics, Speech and Signal Processing (ICASSP), IEEE, May 12, 2019 (May 12, 2019), pp. 7175-7179, XP033565334, DOI: 10.1109/ICASSP.2019.8682801 [retrieved on Apr. 4, 2019].

Hu Ke et al: "Deliberation Model Based Two-Pass End-To-End Speech Recognition", ICASSP 2020—2020 IEEE International Conference on Acoustics, Speech and Signal Processing (ICASSP), IEEE, May 4, 2020 (May 4, 2020), pp. 7799-7803, XP033793266, DOI: 10.1109/ICASSP40776.2020.9053606 [retrieved on Apr. 1, 2020].

\* cited by examiner

DELIBERATION MODEL-BASED TWO-PASS END-TO-END SPEECH RECOGNITION

CROSS-REFERENCE TO RELATED APPLICATIONS

This U.S. patent application claims priority under 35 U.S.C. § 119(e) to U.S. Provisional Application 62/963,721, filed on Jan. 21, 2020. The disclosure of this prior application is considered part of the disclosure of this application and is hereby incorporated by reference in its entirety.

TECHNICAL FIELD

This disclosure relates to two-pass end-to-end speech recognition.

BACKGROUND

Modern automated speech recognition (ASR) systems focus on providing not only high quality (e.g., a low word error rate (WER)), but also low latency (e.g., a short delay between the user speaking and a transcription appearing). Moreover, when using an ASR system today there is a demand that the ASR system decode utterances in a streaming fashion that corresponds to real-time or even faster than real-time. To illustrate, when an ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the present disclosure provides a computer-implemented method that when executed on data processing hardware causes the data processing hardware to perform operations that include receiving a first-pass hypothesis and an encoded acoustic frame, and encoding the first-pass hypothesis at a hypothesis encode. The first-pass hypothesis is generated by a recurrent neural network (RNN) decoder model for the encoded acoustic frame. The operations also include generating, using a first attention mechanism attending to the encoded acoustic frame, a first context vector, and generating, using a second attention mechanism attending to the encoded first-pass hypothesis, a second context vector. The operations also include decoding the first context vector and the second context vector at a context vector decoder to form a second-pass hypothesis.

Implementations of the disclosure may include one or more of the following optional features. In some implementations, decoding the first context vector and the second context vector includes decoding a concatenation of the first context vector and the second context vector. Encoding the first-pass hypothesis may include bi-directionally encoding the first-pass hypothesis at the hypothesis encoder to generate contextual information from the first-pass hypothesis. Here, the hypothesis encoder may include a long short term memory (LSTM) network.

In some examples, the operations further include encoding the acoustic frame at a shared encoder and generating the first-pass hypothesis at the RNN decoder model based on the encoded acoustic frame communicated from the shared encoder. In these examples, the operations may further include generating an acoustic embedding at a unidirectional audio encoder based on the encoded acoustic frame communicated from the shared encoder. Here, the unidirectional audio encoder may include a long short term memory (LSTM) network that may have at least two layers.

In some implementations, the operations also include training the RNN decoder model and training a deliberation decoder while parameters of the trained RNN decoder model remain fixed. The deliberation decoder includes the hypothesis encoder, the first attention mechanism, the second attention mechanism, and the context vector decoder. In these implementations, the operations may also include minimizing a word error rate during training of the RNN decoder model and the deliberation decoder model.

In other implementations, the operations include jointly training the RNN decoder model and a deliberation decoder that includes the hypothesis encoder, the first attention mechanism, the second attention mechanism, and the context vector decoder. In these implementations, the operations may further include minimizing a word error rate during the joint training of the RNN decoder model and the deliberation decoder model. The data processing hardware may reside on a user device.

Another aspect of the present disclosure provides a system that includes data processing hardware and memory hardware in communication with the data processing hardware and storing instructions that when executed by the data processing hardware cause the data processing hardware to perform operations that include receiving a first-pass hypothesis and an encoded acoustic frame, and encoding the first-pass hypothesis at a hypothesis encode. The first-pass hypothesis is generated by a recurrent neural network (RNN) decoder model for the encoded acoustic frame. The operations also include generating, using a first attention mechanism attending to the encoded acoustic frame, a first context vector, and generating, using a second attention mechanism attending to the encoded first-pass hypothesis, a second context vector. The operations also include decoding the first context vector and the second context vector at a context vector decoder to form a second-pass hypothesis.

This aspect may include one or more of the following optional features. In some implementations, decoding the first context vector and the second context vector includes decoding a concatenation of the first context vector and the second context vector. Encoding the first-pass hypothesis may include bi-directionally encoding the first-pass hypothesis at the hypothesis encoder to generate contextual information from the first-pass hypothesis. Here, the hypothesis encoder may include a long short term memory (LSTM) network.

In some examples, the operations further include encoding the acoustic frame at a shared encoder and generating the first-pass hypothesis at the RNN decoder model based on the encoded acoustic frame communicated from the shared encoder. In these examples, the operations may further include generating an acoustic embedding at a unidirectional audio encoder based on the encoded acoustic frame communicated from the shared encoder. Here, the unidirectional audio encoder may include a long short term memory (LSTM) network that may have at least two layers.

In some implementations, the operations also include training the RNN decoder model and training a deliberation decoder while parameters of the trained RNN decoder model remain fixed. The deliberation decoder includes the hypothesis encoder, the first attention mechanism, the second attention mechanism, and the context vector decoder. In these implementations, the operations may also include minimizing a word error rate during training of the RNN decoder model and the deliberation decoder model.

In other implementations, the operations include jointly training the RNN decoder model and a deliberation decoder that includes the hypothesis encoder, the first attention mechanism, the second attention mechanism, and the context vector decoder. In these implementations, the operations may further include minimizing a word error rate during the joint training of the RNN decoder model and the deliberation decoder model. The data processing hardware may reside on a user device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
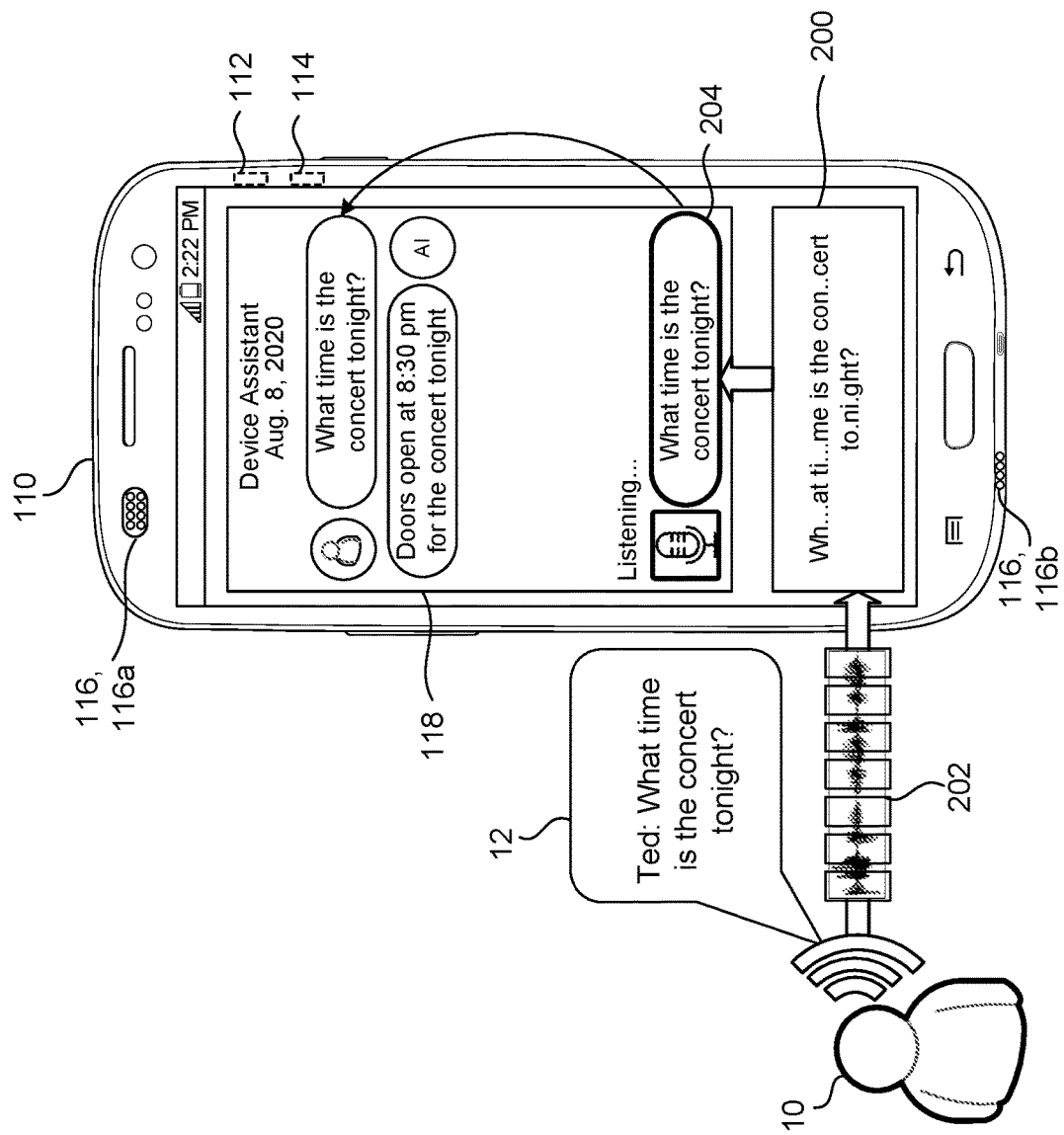
FIGS. 1A and 1B are schematic views of example speech environments using a deliberation two-pass architecture.

Speech recognition continues to evolve to meet the untethered and the nimble demands of a mobile environment. New speech recognition architectures or improvements to existing architectures continue to be developed that seek to increase the quality of automatic speech recognition systems (ASR). To illustrate, speech recognition initially employed multiple models where each model had a dedicated purpose. For instance, an ASR system included an acoustic model (AM), a pronunciation model (PM), and a language model (LM). The acoustic model mapped segments of audio (i.e., frames of audio) to phonemes. The pronunciation model connected these phonemes together to form words while the language model was used to express the likelihood of given phrases (i.e., the probability of a sequence of words). Yet although these individual models worked together, each model was trained independently and often manually designed on different datasets.

The approach of separate models enabled a speech recognition system to be fairly accurate, especially when the training corpus (i.e., body of training data) for a given model caters to the effectiveness of the model. However, the need to independently train separate models introduced its own complexities and led to an architecture with integrated models. These integrated models sought to use a single neural network to directly map an audio waveform (i.e., input sequence) to an output sentence (i.e., output sequence). This resulted in a sequence-to-sequence approach, which generated a sequence of words (or graphemes) when given a sequence of audio features. Examples of sequence-to-sequence models include "attention-based" models and "listen-attend-spell" (LAS) models. A LAS model transcribes speech utterances into characters using a listener component, an attender component, and a speller component. Here, the listener is a recurrent neural network (RNN) encoder that receives an audio input (e.g., a time-frequency representation of speech input) and maps the audio input to a higher-level feature representation. The attender attends to the higher-level feature to learn an alignment between input features and predicted subword units (e.g., a grapheme or a wordpiece). The speller is an attention-based RNN decoder that generates character sequences from the input by producing a probability distribution over a set of hypothesized words. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

Although early E2E models proved accurate and a training improvement over individually trained models, these E2E models, such as the LAS model, functioned by reviewing an entire input sequence before generating output text, and thus, did not allow streaming outputs as inputs were received. Without streaming capabilities, an LAS model is unable to perform real-time voice transcription. Due to this deficiency, deploying the LAS model for speech applications that are latency sensitive and/or require real-time voice transcription may pose issues. This makes an LAS model alone not an ideal model for mobile technology (e.g., mobile phones) that often relies on real-time applications (e.g., real-time communication applications).

Additionally, speech recognition systems that have acoustic, pronunciation, and language models, or such models composed together, may rely on a decoder that has to search a relatively large search graph associated with these models. With a large search graph, it is not conducive to host this type of speech recognition system entirely on-device. Here, when a speech recognition system is hosted "on-device," a device that receives the audio input uses its processor(s) to execute the functionality of the speech recognition system. For instance, when a speech recognition system is hosted entirely on-device, the processors of the device do not need to coordinate with any off-device computing resources to perform the functionality of the speech recognition system. A device that performs speech recognition not entirely on-device relies on remote computing (e.g., of a remote computing system or cloud computing) and therefore online connectivity to perform at least some function of the speech recognition system. For example, a speech recognition system performs decoding with a large search graph using a network connection with a server-based model.

Unfortunately, being reliant upon a remote connection makes a speech recognition system vulnerable to latency issues and/or inherent unreliability of communication networks. To improve the usefulness of speech recognition by avoiding these issues, speech recognition systems have again evolved into a form of a sequence-to-sequence model known as a recurrent neural network transducer (RNN-T). A RNN-T does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and able to run offline (i.e., without a network connection); therefore, avoiding unreliability issues with communication networks.

In addition to speech recognition systems operating with low latency, a speech recognition system also needs to be accurate at recognizing speech. Often for models that perform speech recognition, a metric that may define an accuracy of a model is a word error rate (WER). A WER refers to a measure of how many words are changed compared to a number of words actually spoken. Commonly, these word changes refer to substitutions (i.e., when a word gets replaced), insertions (i.e., when a word is added), and/or deletions (i.e., when a word is omitted). To illustrate, a speaker says "car," but an ASR system transcribes the word "car" as "bar." This is an example of a substitution due to phonetic similarity. When measuring the capability of an ASR system compared to other ASR systems, the WER may indicate some measure of improvement or quality capability relative to another system or some baseline.

Although an RNN-T model showed promise as a strong candidate model for on-device speech recognition, the RNN-T model alone still lags behind a large state-of-the-art conventional model (e.g., a server-based model with separate AM, PM, and LMs) in terms of quality (e.g., speech recognition accuracy). Yet a non-streaming E2E, LAS model has speech recognition quality that is comparable to large state-of-the-art conventional models. To capitalize on the quality of a non-steaming E2E LAS model, implementations herein are directed toward a two-pass speech recognition system (e.g., shown in FIG. 2A) that includes a first-pass component of an RNN-T network followed by a second-pass component of a LAS network. With this design, the two-pass model benefits from the streaming nature of an RNN-T model with low latency while improving the accuracy of the RNN-T model through the second-pass incorporating the LAS network. Although the LAS network increases the latency when compared to only a RNN-T model, the increase in latency is reasonably slight and complies with latency constraints for on-device operation. With respect to accuracy, a two-pass model achieves a 17-22% WER reduction when compared to a RNN-T alone and has a similar WER when compared to a large conventional model.

Figure 2A:
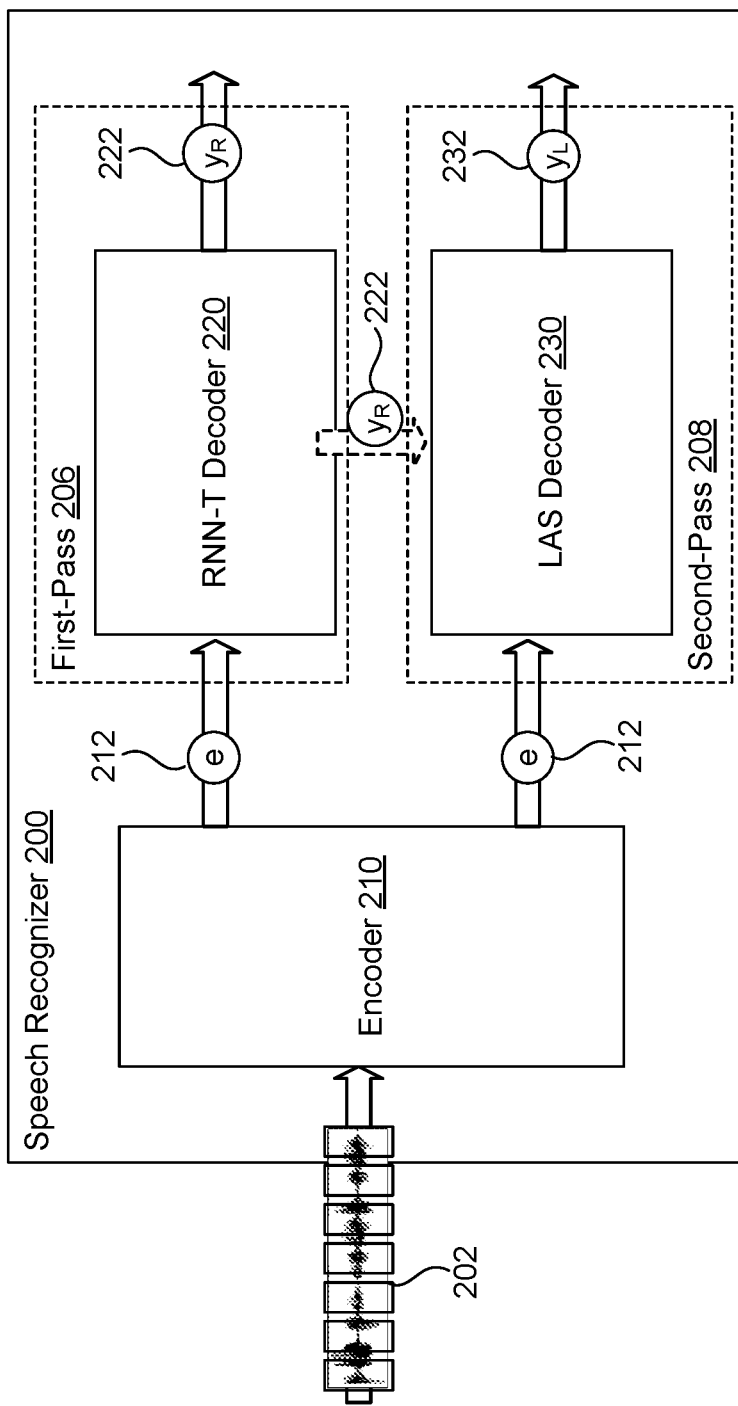
FIG. 2A is a schematic view of an example traditional two-pass architecture for speech recognition.
Figure 2B:
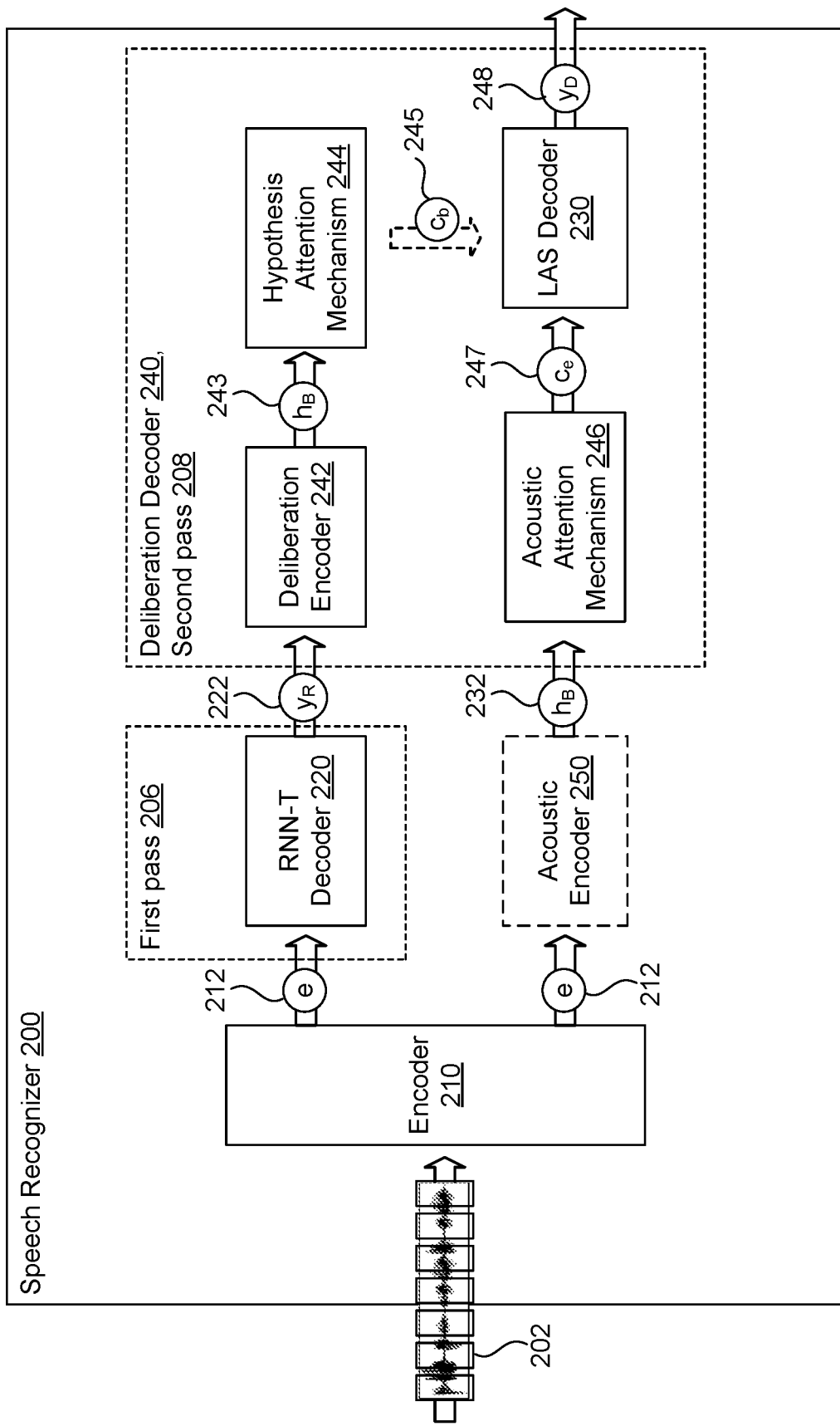
FIG. 2B is a schematic view of the example deliberation two-pass architecture of FIG. 1A for speech recognition.

In a two-pass model, the non-streaming LAS model, for example, rescores streamed hypotheses from a first-pass. This second-pass LAS model approach attends to acoustics in order to rescore hypotheses. In contrast, an alternative method known as a class of neural correction model uses text instead of acoustics to generate hypotheses. In other words, there are different variables that may be attended to in order to refine a hypothesis in a second-pass. As such, the model proposed herein is a variation on the RNN-T/LAS two-pass model. This variant uses a deliberation network that combines acoustics and first-pass text hypotheses for the second pass of the two-pass model. By using a deliberation network, a two-pass model (e.g., as shown in FIG. 2B) may become more accurate when compared to a two-pass model without a deliberation network (e.g., as shown in FIG. 2A) and also more accurate than a large conventional speech recognition model. For instance, in some tests, the deliberation two-pass model has achieved 12% relative WER reduction when compared to the two-pass model without a deliberation network and nearly 21% relative WER reduction when compared to a large convention speech recognition model.

Figure 1B:
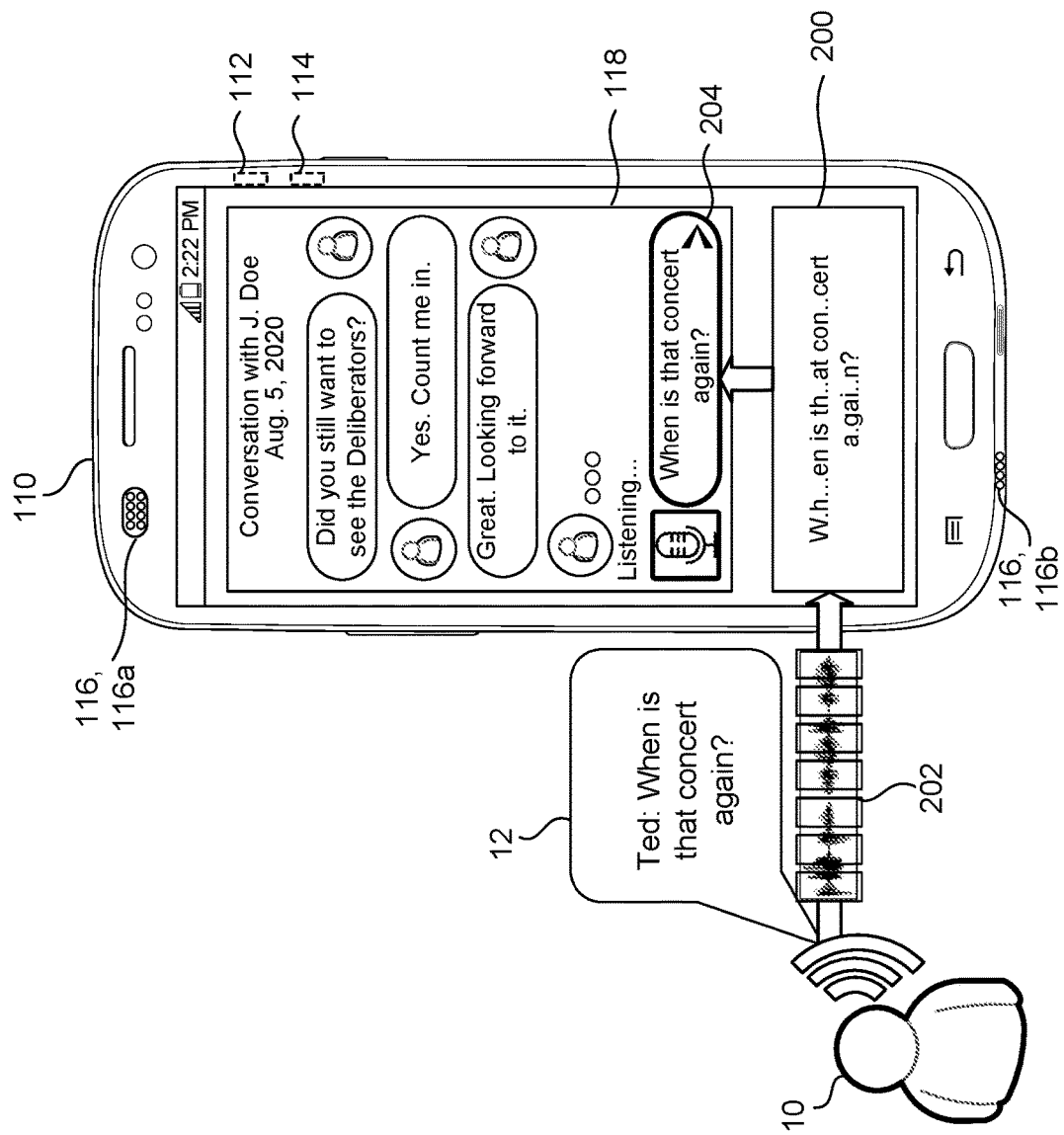

FIGS. 1A and 1B are examples of a speech environment 100. In the speech environment 100 a user's 10 manner of interacting with a computing device, such as a user device 110, may be through voice input. The user device 110 (also referred to generally as a device 110) is configured to capture sounds (e.g., streaming audio data) from one or more users 10 within the speech-enabled environment 100. Here, the streaming audio data 12 may refer to a spoken utterance by the user 10 that functions as an audible query, a command for the device 110, or an audible communication captured by the device 110. Speech-enabled systems of the device 110 may field the query or the command by answering the query and/or causing the command to be performed.

The user device 110 may correspond to any computing device associated with a user 10 and capable of receiving audio data 12. Some examples of user devices 110 include, but are not limited to, mobile devices (e.g., mobile phones, tablets, laptops, etc.), computers, wearable devices (e.g., smart watches), smart appliances, internet of things (IoT) devices, smart speakers, etc. The user device 110 includes data processing hardware 112 and memory hardware 114 in communication with the data processing hardware 112 and storing instructions, that when executed by the data processing hardware 112, cause the data processing hardware 112 to perform one or more operations. The user device 110 further includes an audio subsystem 116 with an audio capture device (e.g., microphone) 116, 116a for capturing and converting spoken utterances 12 within the speech-enabled system 100 into electrical signals and a speech output device (e.g., a speaker) 116, 116b for communicating an audible audio signal (e.g., as output audio data from the device 110). While the user device 110 implements a single audio capture device 116a in the example shown, the user device 110 may implement an array of audio capture devices 116a without departing from the scope of the present disclosure, whereby one or more capture devices 116a in the array may not physically reside on the user device 110, but be in communication with the audio subsystem 116. The user device 110 (e.g., using the hardware 112, 114) is further configured to perform speech recognition processing on the streaming audio data 12 using a speech recognizer 200. In some examples, the audio subsystem 116 of the user device 110 that includes the audio capture device 116a is configured to receive audio data 12 (e.g., spoken utterances) and to convert the audio data 12 into a digital format compatible with the speech recognizer 200. The digital format may correspond to acoustic frames (e.g., parameterized acoustic frames), such as mel frames. For instance, the parameterized acoustic frames correspond to log-mel filterbank energies.

In some examples, such as FIG. 1A, the user 10 interacts with a program or application 118 of the user device 110 that uses the speech recognizer 200. For instance, FIG. 1A depicts the user 10 communicating with an automated assistant application. In this example, the user 10 asks the automated assistant, "What time is the concert tonight?" This question from the user 10 is a spoken utterance 12 captured by the audio capture device 116a and processed by audio subsystems 116 of the user device 110. In this example, the speech recognizer 200 of the user device 110 receives the audio input 202 (e.g., as acoustic frames) of "what time is the concert tonight" and transcribes the audio input 202 into a transcription 204 (e.g., a text representation of "what time is the concert tonight?"). Here, the automated assistant of the application 118 may respond to the question posed by the user 10 using natural language processing. Natural language processing generally refers to a process of interpreting written language (e.g., the transcription 204) and determining whether the written language prompts any action. In this example, the automated assistant uses natural language processing to recognize that the question from the user 10 regards the user's schedule and more particularly a concert on the user's schedule. By recognizing these details with natural language processing, the automated assistant returns a response to the user's query where the response states, "Doors open at 8:30 pm for the concert tonight." In some configurations, natural language processing may occur on a remote system in communication with the data processing hardware 112 of the user device 110.

FIG. 1B is another example of speech recognition with the speech recognizer 200. In this example, the user 10 associated with the user device 110 is communicating with a friend named Jane Doe with a communication application 118. Here, the user 10 named Ted, communicates with Jane by having the speech recognizer 200 transcribe his voice inputs. The audio capture device 116 captures these voice inputs and communicates them in a digital form (e.g., acoustic frames) to the speech recognizer 200. The speech recognizer 200 transcribes these acoustic frames into text that is sent to Jane via the communication application 118. Because this type of application 118 communicates via text, the transcription 204 from the speech recognizer 200 may be sent to Jane without further processing (e.g., natural language processing).

In some examples, such as FIGS. 2A and 2B, the speech recognizer 200 is configured in a two-pass architecture. Generally speaking, the two-pass architecture of the speech recognizer 200 includes at least one encoder 210, an RNN-T decoder 220, and a LAS decoder 230. Here, FIG. 2A depicts a traditional two-pass architecture while FIG. 2B depicts an enhanced two-pass architecture with a deliberation network 240. As can be seen in these figures, the enhanced two-pass architecture of FIG. 2B builds on the fundamental two-pass structure of FIG. 2A. In two-pass decoding, the second pass 208 (e.g., shown as the LAS decoder 230) may improve the initial outputs from the first pass 206 (e.g., shown as the RNN-T decoder 220) with techniques such as lattice rescoring or n-best re-ranking. In other words, the RNN-T decoder 220 produces streaming predictions and the LAS decoder 230 finalizes the prediction. Here, specifically, the LAS decoder 230 rescores streamed hypotheses 222 $y_R$ from the RNN-T decoder 220. Although it is generally discussed that the LAS decoder 230 functions in a rescoring mode that rescores streamed hypotheses 222 $y_R$ from the RNN-T decoder 220, the LAS decoder 230 is also capable of operating in different modes, such as a beam search mode, depending on design or other factors (e.g., utterance length).

The at least one encoder 210 is configured to receive, as an audio input 202, acoustic frames corresponding to streaming audio data 12. The acoustic frames may be previously processed by the audio subsystem 116 into parameterized acoustic frames (e.g., mel frames and/or spectral frames). In some implementations, the parameterized acoustic frames correspond to log-mel filterbank energies with log-mel features. For instance, the parameterized input acoustic frames that are output by the audio subsystem 116 and that are input into the encoder 210 may be represented as $x=(x_1, \ldots, x_T)$, where $x_t \in \mathbb{R}^d$ are log-mel filterbank energies, T denotes the number of frames in x, and d represents the number of log-Mel features. In some examples, each parameterized acoustic frame includes 128-dimensional log-mel features computed within a short shifting window (e.g., 32 milliseconds and shifted every 10 milliseconds). Each feature may be stacked with previous frames (e.g., three previous frames) to form a higher-dimensional vector (e.g., a 512-dimensional vector using the three previous frames). The features forming the vector may then be downsampled (e.g., to a 30 millisecond frame rate). Based on the audio input 202, the encoder 210 is configured to generate an encoding e. For example, the encoder 210 generates encoded acoustic frames (e.g., encoded mel frames or acoustic embeddings).

Although the structure of the encoder 210 may be implemented in different ways, in some implementations, the encoder 210 is a long-short term memory (LSTM) neural network. For instance, the encoder 210 includes eight LSTM layers. Here, each layer may have 2,048 hidden units followed by a 640-dimensional projection layer. In some examples, a time-reduction layer is inserted with the reduction factor N=2 after the second LSTM layer of encoder 210.

In some configurations, the encoder 210 is a shared encoder network. In other words, instead of each pass network 206, 208 having its own separate encoder, each pass 206, 208 shares a single encoder 210. By sharing an encoder, an ASR speech recognizer 200 that uses a two-pass architecture may reduce its model size and/or its computational cost. Here, a reduction in model size may help enable the speech recognizer 200 to function well entirely on-device.

During the first pass 206, the encoder 210 receives each acoustic frame of the audio input 202 and generates an output 212 (e.g., shown as the encoding e of the acoustic frame). The RNN-T decoder 220 receives the output 212 for each frame and generates an output 222, shown as the hypothesis $y_R$, at each time step in a streaming fashion. In some implementations, the RNN-T decoder 220 includes a prediction network and a joint network. Here, the prediction network may have two LSTM layers of 2,048 hidden units and a 640-dimensional projection per layer as well as an embedding layer of 128 units. The outputs 212 of the encoder 210 and the prediction network may be fed into the joint network that includes a softmax predicting layer. In some examples, the joint network of the RNN-T decoder 220 includes 640 hidden units followed by a softmax layer that predicts 4,096 mixed-case word pieces.

In the two-pass model of FIG. 2A, during the second pass 208, the LAS decoder 230 receives the output 212 from the encoder 210 for each frame and generates an output 232 designated as the hypothesis $y_L$. When the LAS decoder 230 operates in a beam search mode, the LAS decoder 230 produces the output 232 from the output 212 alone; ignoring the output 222 of the RNN-T decoder 220. When the LAS decoder 230 operates in the rescoring mode, the LAS decoder 230 obtains the top-K hypotheses from the RNN-T decoder 220 and then the LAS decoder 230 is run on each sequence in a teacher-forcing mode, with attention on the output 212, to compute a score. For example, a score combines a log probability of the sequence and an attention coverage penalty. The LAS decoder 230 selects a sequence with the highest score to be the output 232. Here, in the rescoring mode, the LAS decoder 230 may include multi-headed attention (e.g., with four heads) to attend to the output 212. Furthermore, the LAS decoder 230 may be a two-layer LAS decoder 230 with a softmax layer for prediction. For instance, each layer of the LAS decoder 230 has 2,048 hidden units followed by a 640-dimensional projection. The softmax layer may include 4,096 dimensions to predict the same mixed-case word pieces from the softmax layer of the RNN-T decoder 220.

Referring to FIG. 2B, the first pass 206 remains the same, but the second pass 208 uses a deliberation decoder 240 that includes a deliberation encoder 242 and two attention mechanisms 244, 246, a hypothesis attention mechanism 244 and an acoustic attention mechanism 246, in addition to the LAS decoder 230. Here, compared to the speech recognizer 200 of FIG. 2A, the speech recognizer 200 of FIG. 2B attends to both acoustics, by attending to the output 212 of the encoder 210 at the acoustic attention mechanism 246, and the first-pass hypotheses, by attending to the outputs 222 of the RNN-T decoder 220 at the hypothesis attention mechanism 244. In contrast, the speech recognizer 200 of FIG. 2A only attends to the acoustics by attending to the output 212 of the encoder 210 at the LAS decoder itself. By attending to both acoustics (e.g., the output 212 represented as e) and the first-pass hypotheses, the deliberation decoder 240 generates the output 248 (e.g., a prediction sequence). Here, each attention mechanism 244, 246 forms a context vector 245, 247 (e.g., an acoustic context vector 247 and a hypothesis context vector 245) that is input into the LAS decoder 230 of the deliberation decoder 240. These context vectors 245, 247 may be concatenated as inputs into the LAS decoder 230. Much like the attention mechanism inherent to the LAS decoder 230 as described above, the attention mechanisms 244, 246 may have a similar structure such that each attention mechanism 244, 246 includes multi-headed attention (e.g., four heads).

The deliberation encoder 242 further encodes the output 222 of the RNN-T decoder 220 (i.e., the output 222 of the first pass 206) to form the encoded hypotheses 243 (e.g., shown as $h_B$). When further encoding the output 222, the deliberation encoder 242 may also encode the output 222 for useful context information to include in the encoded hypotheses 243. For example, the deliberation encoder 242 is a bidirectional encoder capable of including the context information. The deliberation encoder 242 may also be configured to encode multiple hypotheses 222. For instance, the deliberation encoder 242 encodes each hypothesis 222 separately and then concatenates each encoded hypothesis together. Structurally, the deliberation encoder 242 may be a LSTM encoder (e.g., a 2-layer bidirectional LSTM encoder). As an LSTM encoder, each layer of the deliberation encoder 242 may include 2,048 hidden units followed by a 320-dimensional projection.

During the second pass 208, the speech recognizer 200 of FIG. 2B may perform a beam search mode or a rescoring mode to generate the output 248. In a rescoring mode, the deliberation decoder 240 may run on the output 222 in a teacher-forcing mode. Additionally or alternatively, when in a rescoring mode, using a bidirectional deliberation encoder 242 may help to improve the relative WER of the deliberation decoder two-pass architecture.

In some examples, the speech recognizer 200 of FIG. 2B also includes an acoustic encoder 250. For instance, the deliberation encoder 242 and the LAS decoder 230 may have some degree of incompatibility that may be overcome by using the acoustic encoder 250. In other words, the acoustic encoder 250 may further encode the output 212. In some implementations, the acoustic encoder 250 is a LSTM encoder (e.g., a two-layer LSTM encoder) that further encodes the output 212 from the encoder 210. By including an additional encoder, the encoder 210 may still be preserved as a shared encoder between passes 206, 208. Additionally or alternatively, the acoustic encoder 250 may be a unidirectional encoder to reduce potential latency within the enhanced two-pass architecture.

A neural network is generally trained by back propagation that defines a loss function (e.g., a cross-entropy loss function). For instance, the loss function is defined as a difference between the actual outputs of the network and the desired outputs of the network. Here, the speech recognizer 200 may be trained using either a cross entropy loss approach or a joint training approach. In a cross entropy loss approach, a deliberation model, such as the speech recognizer 200 with the deliberation decoder 240 (i.e., deliberation-based recognizer 200), is trained in a two-step training process. During the first step of the training process, the RNN-T decoder 220 is trained. After the RNN-T decoder 220 has been trained, parameters for the RNN-T decoder 220 are fixed and only the deliberation decoder 240 and additional encoder layers (e.g., the deliberation encoder 242 and the acoustic encoder 250) are trained.

In contrast, sometimes training the deliberation decoder 240 while fixing parameters of the RNN-T decoder 220 is not optimal since components of a deliberation-based recognizer 200 are not jointly updated. As an alternative training approach, the deliberation-based recognizer 200 may be jointly trained using a combined loss approach represented by the following equation:

$$L_{joint}(\theta_e, \theta_1, \theta_2) = L_{RNNT}(\theta_e, \theta_1) + \lambda L_{CE}(\theta_e, \theta_2) \quad (1)$$

where $L_{RNNT}(-)$ is the RNN–T loss and $\lambda L_{CE}(-)$ is the cross entropy loss for the deliberation decoder 240. $\theta_e$, $\theta_1$, and $\theta_2$ denote the parameters of the encoder 210, the RNN-T decoder 220, and the deliberation decoder 230, respectively. Here, joint training is similar to the concept of "deep fine tuning" but without a pre-trained decoder.

Following either of these approaches, the speech recognizer 200 may be further trained using a minimum WER (MWER) loss to optimize the expected word error rate by using n-best hypotheses. This MWER loss training may be represented by the following equation:

$$L_{MWER}(x, y^*) = \sum_{i=1}^{B} \hat{P}(x)[W(y^*) - \hat{W}] \quad (2)$$

where $y_d^i$ is the ith hypothesis 248 from the deliberation decoder 240, and $W(y_d^i|y^*)$ is the number of word errors for $y_d^i$ with respect to the ground truth target $y^*$. $P(y_d^i|x)$ is the probability of the ith hypothesis normalized over all other hypotheses to sum to 1. B is the beam size. When cross entropy loss is combined with MWER loss, the following equation may be used to stabilize training where $\alpha=0.01$:

$$L'_{MWER}(x, y^*) L_{MWER}(x, y^*) + \alpha L_{CE}(x, y^*) \quad (3)$$

Figure 3:
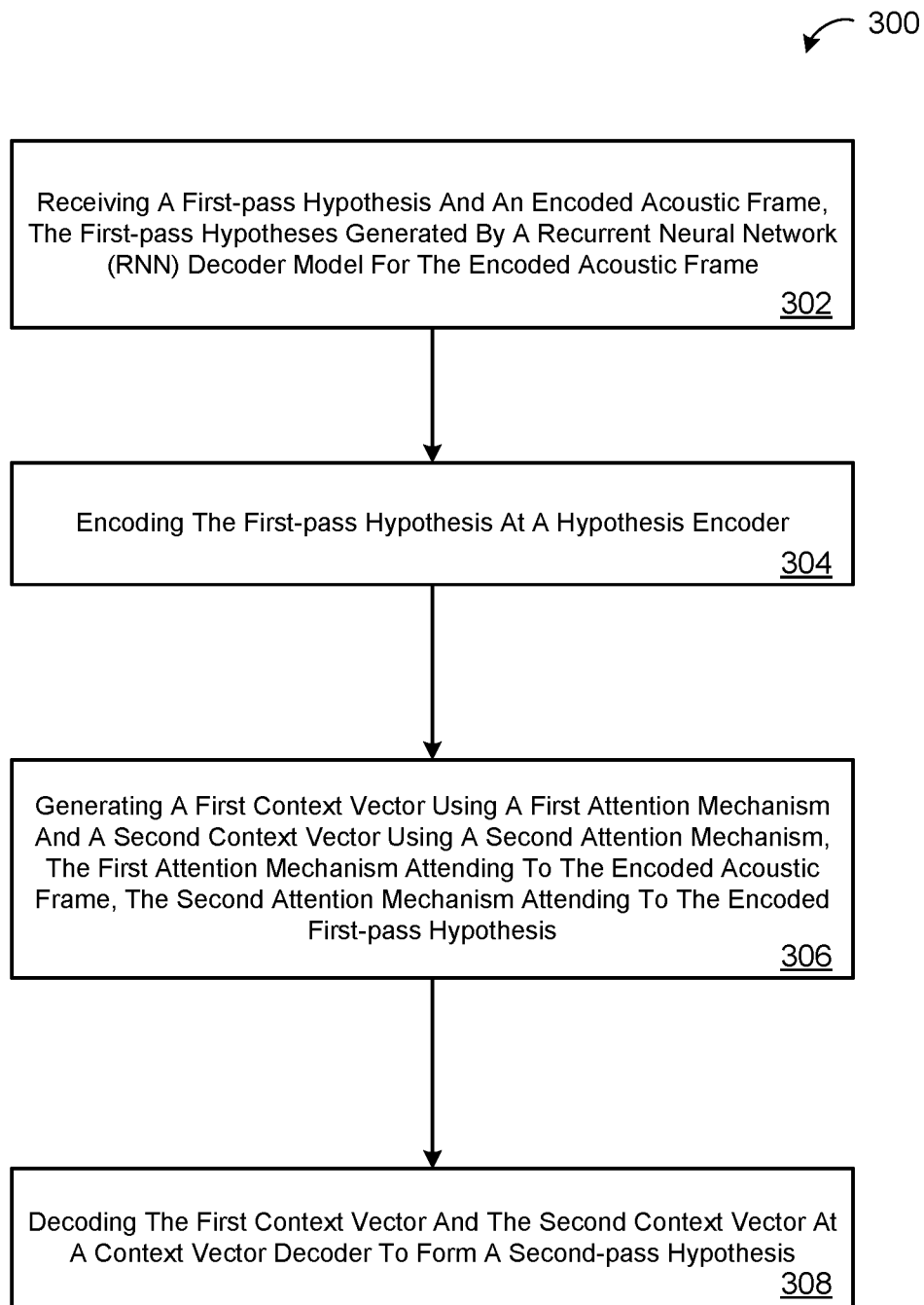
FIG. 3 is a flowchart of an example arrangement of operations for a method of performing speech recognition using the deliberation two-pass architecture of FIG. 2B.

FIG. 3 is a flowchart of an example arrangement of operations for a method 300 of performing automated speech recognition (e.g., ASR) using a deliberation two-pass architecture. At operation 302, the method 300 receives a first-pass hypothesis 222 and an encoded acoustic frame 212. Here, the first pass hypothesis 222 is generated by a RNN decoder 220 for the encoded acoustic frame 212. At operation 304, the method 300 includes encoding the first pass hypothesis 222 at a hypothesis encoder 242. At operation 306, the method 300 includes generating a first context vector 247 using a first attention mechanism 246 and a second context vector 245 using a second attention mechanism 244. The first attention mechanism 246 attends to the encoded acoustic frame 212. The second attention mechanism 244 attends to the encoded first-pass hypothesis 243. At operations 308, the method 300 includes decoding the first context vector 247 and the second context vector 245 at a context vector decoder 230 to form a second-pass hypothesis 248.

Figure 4:
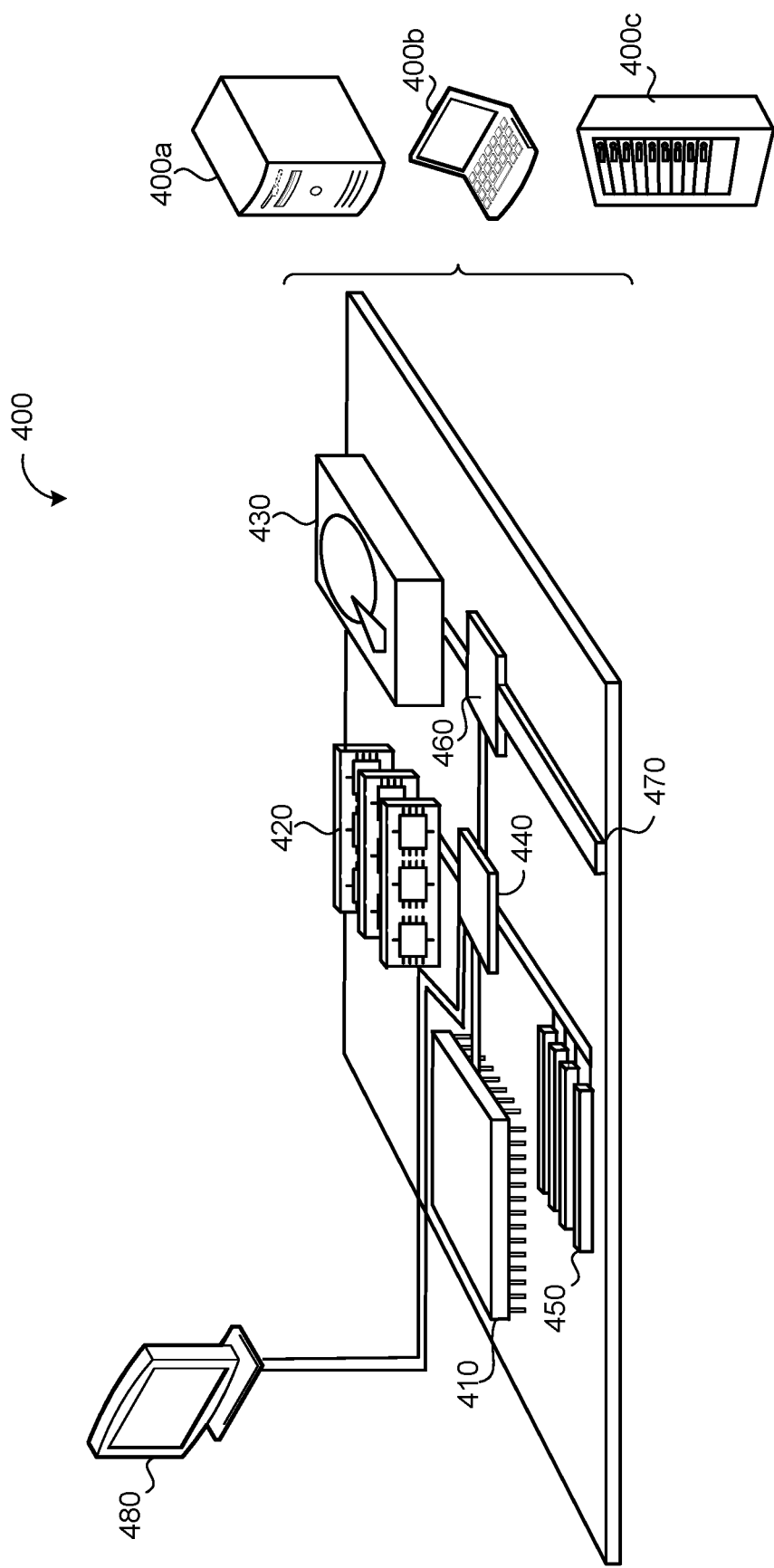
FIG. 4 is a schematic view of an example computing device that may be used to implement the systems and methods described herein.

FIG. 4 is a schematic view of an example computing device 400 that may be used to implement the systems (e.g., the speech recognizer 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 440, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving a first-pass hypothesis and an encoded acoustic frame, the first-pass hypothesis generated by a recurrent neural network (RNN) decoder model for the encoded acoustic frame;
   encoding the first-pass hypothesis at a hypothesis encoder;
   generating, using an acoustic attention mechanism attending to the encoded acoustic frame, a first context vector;
   generating, using a hypothesis attention mechanism attending to the encoded first-pass hypothesis, a second context vector; and
   decoding the first context vector and the second context vector at a context vector decoder to form a second-pass hypothesis.

2. The computer-implemented method of claim 1, wherein decoding the first context vector and the second context vector comprises decoding a concatenation of the first context vector and the second context vector.

3. The computer-implemented method of claim 1, wherein encoding the first-pass hypothesis comprises bi-directionally encoding the first-pass hypothesis at the hypothesis encoder to generate contextual information from the first-pass hypothesis.

4. The computer-implemented method of claim 3, wherein the hypothesis encoder comprises a long short term memory (LSTM) network.

5. The computer-implemented method of claim 1, wherein the operations further comprise:
   encoding the acoustic frame at a shared encoder; and
   generating the first-pass hypothesis at the RNN decoder model based on the encoded acoustic frame communicated from the shared encoder.

6. The computer-implemented method of claim 5, wherein the operations further comprise generating an acoustic embedding at a unidirectional audio encoder based on the encoded acoustic frame communicated from the shared encoder.

7. The computer-implemented method of claim 6, wherein the unidirectional audio encoder comprises a long short term memory (LSTM) network.

8. The computer-implemented method of claim 7, wherein the LSTM network comprises at least two layers.

9. The computer-implemented method of claim 1, wherein the operations further comprise:
   training the RNN decoder model; and
   training a deliberation decoder while parameters of the trained RNN decoder model remain fixed, the deliberation decoder comprising the hypothesis encoder, the acoustic attention mechanism, the hypothesis attention mechanism, and the context vector decoder.

10. The computer-implemented method of claim 9, wherein the operations further comprise minimizing a word error rate during training of the RNN decoder model and the deliberation decoder model.

11. The computer-implemented method of claim 1, wherein the operations further comprise jointly training the RNN decoder model and a deliberation decoder, the deliberation decoder comprising the hypothesis encoder, the acoustic attention mechanism, the hypothesis attention mechanism, and the context vector decoder.

12. The computer-implemented method of claim 11, wherein the operations further comprise minimizing a word error rate during the joint training of the RNN decoder model and the deliberation decoder model.

13. The computer-implemented method of claim 1, wherein the data processing hardware resides on a user device.

14. A system comprising:
   data processing hardware; and
   memory hardware in communication with the data processing hardware, the memory hardware storing instructions that when executed on the data processing hardware cause the data processing hardware to perform operations comprising:
      receiving a first-pass hypothesis and an encoded acoustic frame, the first-pass hypothesis generated by a recurrent neural network (RNN) decoder model for the encoded acoustic frame;
      encoding the first-pass hypothesis at a hypothesis encoder;
      generating, using an acoustic attention mechanism attending to the encoded acoustic frame, a first context vector;
      generating, using a hypothesis attention mechanism attending to the encoded first-pass hypothesis, a second context vector; and decoding the first context vector and the second context vector at a context vector decoder to form a second-pass hypothesis.

15. The system of claim 14, wherein decoding the first context vector and the second context vector comprises decoding a concatenation of the first context vector and the second context vector.

16. The system of claim 14, wherein encoding the first-pass hypothesis comprises bi-directionally encoding the first-pass hypothesis at the hypothesis encoder to generate contextual information from the first-pass hypothesis.

17. The system of claim 16, wherein the hypothesis encoder comprises a long short term memory (LSTM) network.

18. The system of claim 14, wherein the operations further comprise:
    encoding the acoustic frame at a shared encoder; and
    generating the first-pass hypothesis at the RNN decoder model based on the encoded acoustic frame communicated from the shared encoder.

19. The system of claim 18, wherein the operations further comprise generating an acoustic embedding at a unidirectional audio encoder based on the encoded acoustic frame communicated from the shared encoder.

20. The system of claim 19, wherein the unidirectional audio encoder comprises a long short term memory (LSTM) network.

21. The system of claim 20, wherein the LSTM network comprises at least two layers.

22. The system of claim 14, wherein the operations further comprise:
    training the RNN decoder model; and
    training a deliberation decoder while parameters of the trained RNN decoder model remain fixed, the deliberation decoder comprising the hypothesis encoder, the acoustic attention mechanism, the hypothesis attention mechanism, and the context vector decoder.

23. The system of claim 22, wherein the operations further comprise minimizing a word error rate during training of the RNN decoder model and the deliberation decoder model.

24. The system of claim 14, wherein the operations further comprise jointly training the RNN decoder model and a deliberation decoder, the deliberation decoder comprising the hypothesis encoder, the acoustic attention mechanism, the hypothesis attention mechanism, and the context vector decoder.

25. The system of claim 24, wherein the operations further comprise minimizing a word error rate during the joint training of the RNN decoder model and the deliberation decoder model.

26. The system of claim 14, wherein the data processing hardware resides on a user device.

* * * * *